United States Patent Office

2,979,894
Patented Apr. 18, 1961

2,979,894

FUEL FEED AND POWER CONTROL SYSTEM FOR GAS TURBINE ENGINES HAVING A PROPORTIONAL BY-PASS FLUID CONTROL

Harry C. Zeisloft, Rochester, N.Y., assignor to The Bendix Corporation, a corporation of Delaware Filed Feb. 15, 1954, Ser. No. 410,121

13 Claims. (Cl. 60—39.28)

This invention relates to a fuel feed and power control system for gas turbine engines and more particularly to such a system utilizing a proportional type by-pass fuel control unit which is referenced to and operable as a function of an engine temperature schedule. In the copending application of Harry C. Zeisloft, Serial No. 248,402, filed September 26, 1951, now abandoned (common assignee), there is disclosed a fuel scheduling type control for turbo-prop and turbo-jet engines with which a pilot is free to accelerate to a selected power setting and the quantity or weight of fuel supplied to the burners is automatically regulated to permit maximum allowable rate of acceleration within a safe turbine temperature limit and to avoid compressor surge or stall; also, for a propeller type engine, during part throttle operation the fuel is automatically supplied at a rate which will give optimum stability for the torque absorption characteristics of the propeller. This fuel control generally comprises an engine speed governor which is adapted to control the area of a variable fuel metering orifice across which a fixed metering head is maintained. Superimposed on the governing action are scheduled limitations on fuel flow which provide turbine temperature and compressor surge protection during engine acceleration; deceleration fuel flow limitation; and controlled fuel flows for part load engine operation. All of those scheduled limitations of fuel flow, with the exception of the deceleration flow schedule, are functions of a temperature corrected three dimensional cam system which controls the area of the metering orifice as a function of various engine operating parameters. Also included within the control is coordinating means for obtaining desired steady state operating conditions as a function of fuel control governor and part load fuel control settings, both properly coordinated with propeller governor settings.

The scheduling type of fuel control for engines of the type specified may be accurately calibrated to exactly meet the desired engine fuel flow schedules for engine acceleration, deceleration, or steady state operation, under any and all conditions of ambient pressure and/or temperature. The aforesaid type of engine fuel control is, however, inherently limited with respect to its versatility of automatic adaptation to engines having somewhat different optimum fuel flow demands than those for which the control was calibrated to meet, to engines which may utilize different fuels of varying specific gravity and viscosity, and to variations in fuel controls of the same model as a result of manufacturing tolerances and the like. For example, variations in the most desirable schedule of fuel flow for steady state operation for any given engine may occur as a result of changes in combustion efficiency, compressor deterioration, and variations in the type of fuel used, whereas additional variations in said schedule for different engines of the same model may occur as a result of engine to engine and/or control to control variations due to manufacturing tolerances and the like. It is therefore apparent that an accurately calibrated control will not necessarily meet optimum engine fuel requirements throughout the life of a given engine, nor will it or another control of the same model necessarily meet optimum fuel requirements of different engines of the same model.

To circumvent the difficulties inherent in tailoring a control unit for each individual engine, and to eliminate the necessity of resetting the fuel schedule of any given control as engine hours of use and/or fuel type varies, we provide a put-and-take type proportional by-pass fuel control, hereinafter described in detail, in series with the main fuel control unit and operable in conjunction with a turbine temperature sensing electronic temperature and amplifier control means. With this arrangement the main fuel control is calibrated to schedule fuel flow to the engine at a predetermined per cent rich over that flow required for optimum engine performance under all conditions of engine operation, the put-and-take proportional by-pass control being operable at all times to by-pass or withdraw that percentage of total metered fuel flow necessary to maintain an ideal steady state schedule of turbine temperatures and to limit maximum turbine operating temperature during acceleration irrespective of engine and/or fuel control and/or fuel variations. The electronic temperature control and amplifier at all times senses actual turbine inlet temperature and compares said temperature, which is indicated as a voltage, with a reference voltage which is indicative of desired turbine temperature at any given condition of engine operation, the difference between said voltages being indicative of a temperature error which effectively signals the by-pass control to decrease or increase the by-pass flow as necessary to maintain desired turbine temperature. The reference temperature or voltage is always a function of pilot's lever position and engine speed and may be relayed to the temperature control and amplifiers through a potentiometer hereinafter described.

It is one of the primary objects of this invention to provide a by-pass type control device for a fluid flow system which is adapted to withdraw a fixed percentage of the total flow of metered fluid through said system, irrespective of variations in said flow, at any given fixed operating condition of the control device.

Another important object of this invention is to provide a method for controlling internal combustion engines by means of which a charge forming device meters a greater quantity of fuel than is necessary to optimize engine performance and a control device withdraws the necessary percentage of metered fuel to optimize engine performance.

Another important object of this invention is to provide a by-pass type control adapted for use in engine fuel systems for regulating the percentage of by-pass flow in such a system as a function of an engine operating parameter.

A further object of this invention is to provide in a fuel system for gas turbine engines, a put-and-take type by-pass fuel control adapted to withdraw a variable percentage of the total metered fuel flowing to the engine for the purpose of maintaining a predetermined schedule of turbine temperature for all conditions of engine operation.

A further object of this invention is to provide in a fuel system for gas turbine engines a proportional bypass put-and-take fuel control which varies its percentage of put-or-take of fuel to or from the engine burners as a function of a scheduled engine temperature parameter.

Another object of this invention is to provide in a fuel system for gas turbine engines a main fuel control and a by-pass temperature datum control operable conjointly in such a manner that substantially optimum engine performance is realized under any given engine operating condition irrespective of variations from a desired optimum fuel schedule resulting from such things as engine to engine or control to control variations due to manufacturing tolerances, combustion efficiency, fuel type, or compressor deterioration.

The foregoing and other objects and advantages will become apparent in view of the following description taken in conjunction with the drawings, wherein.

Figure 1:
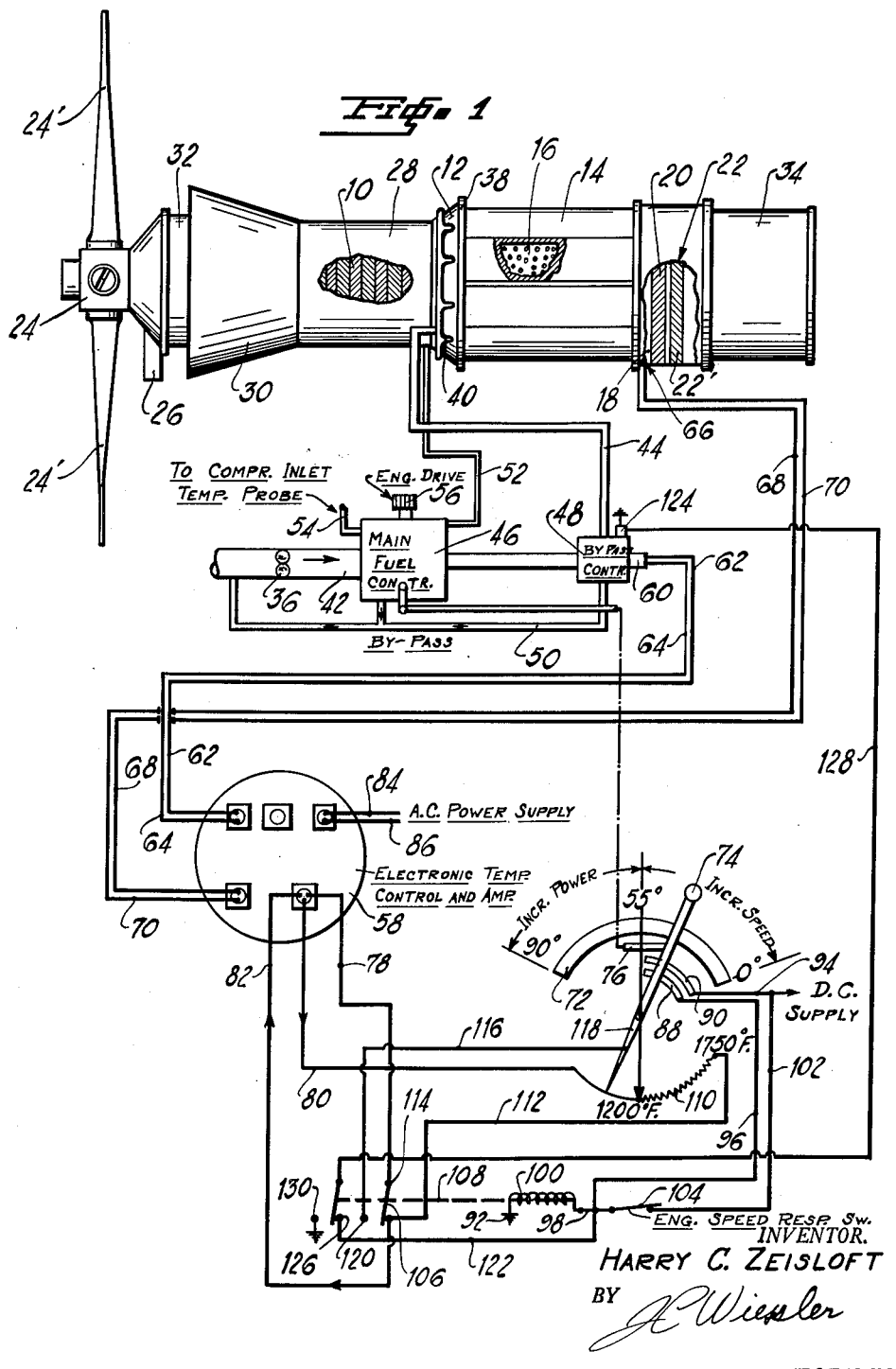
Figure 1 is a diagrammatic view of a turbo-prop engine having operatively associated therewith a functional schematic of a fuel control system which embodies the features of the instant invention.

Referring now to Figure 1, the gas turbine engine in general comprises a compressor 10 which is adapted to force air into an annular header 12 arranged so as to direct the air to a plurality of annularly spaced combustion chambers 14, each of which contains a burner or generator 16 having air inlet holes in the walls thereof through which at least part of the air is fed for admixture with fuel to produce combustion. The burners 16 discharge into a collector ring 18 which is arranged to direct the air and products of combustion through a set of stationary distributing blades 20 against the blades 22′ of a turbine rotor 22. The turbine 22 drives the air compressor 10, and these components may be mounted on a common shaft, not shown, or may be drivingly coupled through transmission mechanism. The turbine in addition to driving the compressor, is adapted to drive a propeller 24 which is provided with variable pitch propeller blades 24′. The pitch changing mechanism may be of any suitable type, and since variable pitch propellers are well known and may be purchased as a complete unit in the open market the pitch changing mechanism is not shown in detail; it includes a propeller governor 26 which may be either of the constant or variable speed type depending on the nature of the most desirable engine operating curve in the power range of engine operation, and which is hereinafter described as a constant speed propeller pitch governor so that the engine operates at a fixed maximum operating speed throughout the range of power operation. The compressor 10 is mounted in a casing or housing 28 forwardly of which is a flared intake or cowling 30 which opens in the direction of aircraft travel. The part indicated at 32 houses the reduction gearing between the turbine and propeller drive. As will be understood, the major part of the available energy resulting from the combustion and expansion of the compressed mixture of air and fuel is utilized in driving the turbine, compressor, and the propeller, whereas the remainder is utilized as jet thrust in a tail cone and exhaust jet nozzle, not shown, housed in the tail piece 34.

Figure 2:
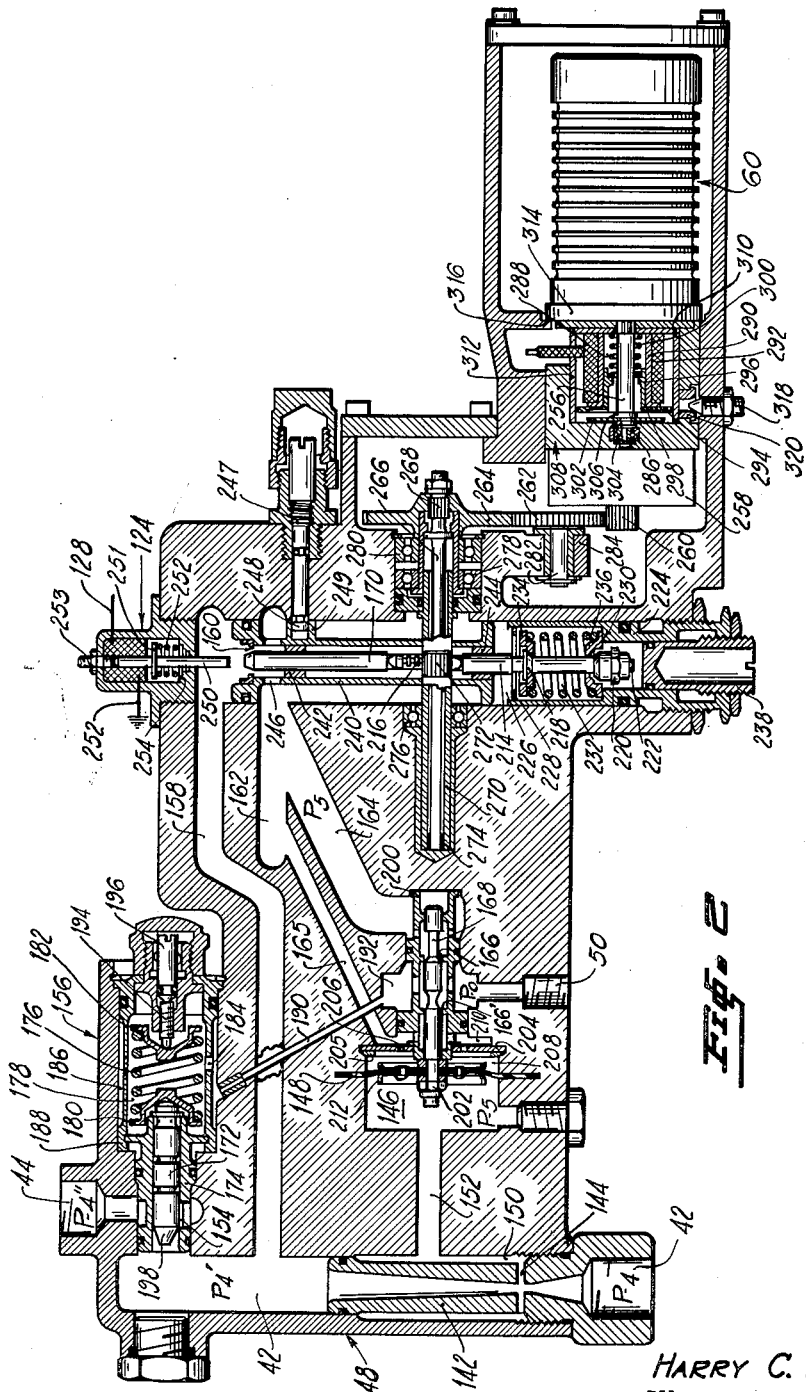
Figure 2 is a sectional schematic view of the proportional by-pass flow control which is diagrammatically shown in the fuel system of Figure 1.

The present invention is concerned with the fuel system and coacting controls therefor, shown more or less diagrammatically in operative relation with the gas turbine engine in Figure 1, and is more particularly concerned with the proportional by-pass control unit and controls therefor, shown in Figures 1 and 2. A fuel pump 36 pressurizes fuel from a reservoir, not shown, to a fuel manifold 38, which is connected by a plurality of conduits 40 to burner nozzles, not shown, in the various combustion chambers 14, through main fuel conduits 42 and 44, a main fuel control device 46, and a proportional by-pass control device 48. A by-pass conduit 50 connects the main and by-pass fuel controls 46 and 48 with the low pressure side of pump 36. The main fuel control device 46 is preferably of the type disclosed and claimed in the copending application of Harry C. Zeisloft, supra, hereinbefore described in genreal terms, which controls the flow of fuel to control 48 as some function of compressor discharge pressure, compressor inlet temperature and engine speed, and is adapted to be sensibly connected to these engine operating parameters through a conduit 52, a conduit 54, and a splined drive member 56 respectively.

The proportional by-pass control device 48, as utilized in this fuel system, operates as a temperature datum control device and is adapted to by-pass or withdraw the necessary percentage of the fuel flowing from main control 46 to maintain a desired schedule of turbine inlet or outlet temperatures under various conditions of engine operation. The by-pass control 48 is in turn effectively controlled by an electronic temperature control and amplifier unit 58 which is connected to a motor actuator unit 60 of control 48 by lead lines 62 and 64 and which is adapted to electrically compare an actual engine operating temperature with a reference or desired temperature which may vary with engine speed and/or pilot's control lever position, the difference between said actual and reference temperatures being measured as an error voltage within the temperature control section of the electronic unit 58 and amplified and transmitted to the motor actuator 60 to control the by-passing function of control 48 so that the actual sensed temperature is maintained equal to the reference temperature during various conditions of engine operation. Electronic unit 58 actually responds to voltages which are proportional to the aforementioned temperatures, which voltages may also be hereinafter referred to as temperatures. The electronic temperature control and amplifier unit 58 may be of the type which is disclosed in the copending application of Billy S. Hegg and Norman K. Peters, Serial No. 212,566, filed February 24, 1951, now abandoned (common assignee).

A suitable type thermocouple 66 is shown in the inlet section to the turbine 22 and measures existing temperature in the turbine inlet area as a voltage, the electronic unit being connected therethrough by lines 68 and 70. A pilot's control quadrant 72 includes a control lever 74 which is adapted to control the setting of main fuel control 46 through a lever 76 and which is operatively connected to the electronic unit 58 through lead lines 78, 80 and 82 for controlling the reference temperature within unit 58 as a function of pilot's control lever position and engine speed through circuitry to be described. Unit 58 receives its electrical power supply from an A.C. generator, not shown, and lead lines 84 and 86.

Between 0° and 55° of pilot's control lever 74 setting a pair of bus bars 88 and 90 are in contact with a conductor section of said lever and complete a circuit from a 24 volt D.C. supply source, not shown, to a ground 92 through lead lines 94, 96 and 98 and a relay 100. A circuit in parallel therewith is completed through a lead line 102, an engine speed switch 104, line 98 and relay 100 whenever the switch 104 is closed. The switch 104 is responsive to engine speed through a well known mechanism, not shown, and remains closed below a predetermined engine operating speed to allow energization of relay 100. A double throw switch 106 is ganged to the relay 100 by a member 108; whenever the relay 100 is energized, switch 106 is held in the position shown. The relay 100 is deenergized only when a predetermined engine speed is attained, which results in an opening of switch 104, and the pilot's lever 74 is positioned at or above 55° of quadrant angle, which breaks the circuit to relay 100 through bus bars 88 and 90. The relay is energized during an engine acceleration to a predetermined constant maximum operating speed. A turbine temperature reference circuit shown external to electronic unit 58 includes line 80, a temperature reference potentiometer 110, and lines 112 and 82. Line 78 connects the temperature control circuit of unit 58 (see copending application of Hegg and Peters, supra) with a common terminal 114 of switch 106 and a line 116 connects a pointer 118 of potentiometer 110 with terminal 120. A line 122 is connected to source line 94 through lines 96 and/or switch 104 and to a solenoid 124 of control 48 through terminal 126 of switch 106 and and a line 128 for a purpose to be described. The resistance of potentiometer 110 is designed to control the reference voltage, to which the unit 58 responds for controlling unit 48 in accordance with a predetermined schedule of turbine inlet temperature, illustrated as covering the reference temperature range from 1200° F. to 1750° F. When lever 74 is positioned between 0° and 55° of quadrant angle or when speed switch 104 is closed, switch 106 is in the position shown and the temperature reference is a constant 1750° F. (the unit operating as a temperature limiter only), which condition exists whenever the engine is operating at a steady state speed below maximum or is being accelerated at a speed below a set maximum operating speed. When lever 74 is in the power range above 55° and switch 104 is open, switch 106 contacts terminals 128 and 130 to connect unit 58 to the reference temperature schedule of potentiometer 110 and to deenergize solenoid 124.

Referring now to Figure 2, a detailed showing of the proportional by-pass control device 48 is shown connected to the main control discharge conduit 42, burner nozzle conduit 44, by-pass conduit 50 and motor 60. A venturi 142 in passage 42 has a transverse passage 144 at the throat thereof which is connected to a static pressure chamber 146, formed on one side of a diaphragm member 148, through an annular chamber 150 and a passage 152. The passage 42 is connected with conduit 44 through an orifice 154 which is controlled by a fuel pressurizing valve unit 156, and to conduit 50 through a branch passage 158, a restriction 160, a chamber 162, parallel passages 164 and 165, and restrictions 166 and 166' which are controlled by a hydraulically balanced by-pass valve 168. The area of restriction 160 is controlled by a contoured by-pass or put-and-take temperature datum valve 170 which is controlled by mechanism to be described.

The pressurizing valve unit 156 functions to insure a predetermined minimum pressure $P_4'$ in conduit 42 before fuel can flow to the burner nozzles through conduit 44 and generally comprises a reciprocable valve member 172 mounted in a sleeve 174 and urged in a closing direction by a spring 176 which is contained within a chamber 178 and abuts spring retainers 180 and 182 at either end thereof, said chamber 178 being at all times in communication with the by-pass conduit 50 through an opening 184, an annular chamber 186 which surrounds a sleeve member 188, a passage 190 and a chamber 192. An adjustment screw member 194 may be axially actuated to adjust the preloading of spring 176 by a slotted extension 196 thereof. When fluid first begins to flow into control 48 the pressurizing valve 172 remains in a closed position until such time as pressure $P_4'$, which acts on the face 198 of valve 172, overcomes the spring 176 and actuates said valve in an opening direction.

The by-pass valve 168 is reciprocably mounted in a sleeve 200 and is fixed at the one end thereof to the diaphragm 148 by a threaded stem and nut assembly 202; a retainer plate 204 containing openings 206 which connect a chamber 208 with chamber 162 through a chamber 210 and passage 165, is held in fixed position by a lock ring 205 and holds sleeve 200 in position. Recessed diaphragm strengthening members 212 are suitably attached to the diaphragm and to the valve 168. Any fluid which flows through restriction 160 and the chamber 162 divides and flows through parallel passages 164 and 165 and thence through by-pass valve restriction 166 and 166' to by-pass conduit 50. The diaphragm 148 is not spring loaded and will therefore control the position of valve 168 in such a manner that the pressures in chambers 146 and 208 are always equal to each other and to the pressure in passage 144 in the throat of venturi 142. As is well known, the square root of the static pressure recovery through a venturi is proportional to the flow of fluid therethrough. With our arrangement this pressure differential is imposed across the proportional by-pass control valve 170 at all times, whereby for any fixed position of valve 170 a constant percentage of the flow of fluid through venturi 142 will be by-passed through restriction 160 irrespective of variations in total flow. The percentage of fluid by-passed will therefore vary only as a function of the area controlling position of valve 170, which position is a function of the error voltage (temperature) output, if any, of electronic unit 58.

Whenever actual turbine inlet temperature, as sensed by thermocouple 66, is equal to the desired reference temperature, as controlled by engine speed and pilot's control level position (see Figure 1), the motor 60 is in a neutral position and the valve 170 assumes its normal or null position, as shown in Figure 2, in which position a predetermined constant percentage of the flow through venturi 142 is by-passed through restriction 160, as previously explained, irrespective of changes in engine operating conditions.

The valve 170 includes an extension member 214 which in turn includes a rack portion 216, a flange 218 and an abutment piece and nut 220 receivable on a threaded end 222 of the valve extension. A partially threaded sleeve member 224 is contained within a chamber 226 and may be externally adjusted in an axial direction with relation to the null position of valve 170 and extension 214 thereof. A lock ring 228 and a stepped portion 230 of sleeve 224 serve as preload abutment means for a spring 232 which is mounted on retainers 234 and 236. A maximum take stop 238 is threaded into the hollowed end of sleeve member 224 and is adjustable to limit the maximum percentage of fuel which the valve 170 may withdraw or take from main fuel conduit 42. The valve 170 is reciprocable within a hollow I-shaped sleeve member 240 which contains valve bearing inserts 242 and 244, restriction 160, and openings 246. A threaded adjustment member 247 having an eccentric 248 at its one end which is contained within a channel shaped transverse extension 249 of sleeve 240, is rotatable to axially adjust the position of sleeve 240, restriction 160, and therefore the effective null position of valve 170. The null position of the valve 170 may be adjusted either by adjustment of restriction 160, as above explained, or by adjustment of the valve 170 by means of the adjustment sleeve 224. Whenever valve 170 is in its null position the preload in spring 232 maintains retainers 234 and 236 in abutment with lock ring 228 and sleeve step 230, respectively.

The solenoid 124, as diagrammatically illustrated, comprises a maximum put-stop or stem 250 having a flange 251 thereon against which a spring 252 abuts and urges stem 250 against an adjustable stop 253 whenever the solenoid is not energized; i.e. when the left side of switch 106 is in contact with terminal 130. When switch 106 closes terminal 126 the solenoid is energized thereby urging stem 250 downwardly until flange 251 abuts an annular stop 254. When solenoid 124 is energized, as during an acceleration of the engine, the stem 250 is brought into abutment with valve 170 when said latter valve is in its null position, thereby eliminating the possibility of by-passing less than the normal or null percentage of fuel but not affecting the maximum percentage which may be by-passed. In other words, whenever solenoid 124 is energized, control 48 cannot "put" fuel to compensate for a possible under temperature condition during acceleration, but can "take" fuel beyond the normal or null percentage to eliminate the possiblity of accelerating at an over-temperature condition. When solenoid 124 is deenergized, as during power operation above 55° of quadrant angle, stem 250 is backed off to stop 253 in which position it acts as a minimum by-pass or maximum put stop and valve 170 can then move in either direction from a null position to accurately control turbine temperature to a predetermined value for every quadrant position above 55°. During an engine acceleration therefore, control 48 operates only to limit maximum turbine inlet temperature to a predetermined maximum value of, say, 1750° F., whereas during operation in the power range, control 48 operates to accurately regulate turbine temperature to a desired schedule, as will be hereinafter more fully explained. If, during power operation, valve 170 is actuated toward its put or take stop by motor 60 as a result of an under or over temperature condition at the turbine inlet, abutment 220 or 218 respectively, will seat on its adjacent spring retainer, thereby actuating the retainer and spring away from the maximum take stop if the needle is moving in a put direction and away from the maximum put stop if the needle is moving in a take direction.

The motor 60 is a 400 cycle, 2 phase, reversible type servo motor-generator combination such as is shown in the copending application of Hegg and Peters, supra, and is connected to the rack 216 of valve 170 through a rotatable step-down shaft 256, a gear train contained within housing 258, a spline 260, an idler gear 262, a valve drive gear 264, and a torsion bar 266 which meshes with gear 264 at an internally splined section 268 and which passes through a hollow cylindrical sleeve member 270 having a gear 272 thereon which is arranged to mesh with rack 216, said torsion bar 266 being rigidly connected, as by brazing, to sleeve 270 at section 274. In practice, a gear ratio of 1,000:1 is used between motor 60 and valve 170 which results in a maximum required motor torque of 0.6 inch-ounce. The sleeve, torsion bar and gear assembly 270, 266 and 264 is supported in the housing of control 48 by bearings 276, 278 and 280, and the idler gear 262 has a shaft 282 which may rotate in a bearing 284. The step-down motor shaft 256 is supported between the gear train and motor housings by a bearing 286 and is rotatable in a chamber 288 formed by a solenoid core 290 on which is wound a coil 292, which together with an axially movable ring-shaped brake shoe 294, an armature and spring retainer 296 to which the said brake shoe is fixedly connected at a groove 298 therein and which is urged leftwardly or in a braking direction by a spring 300, and a rotatable friction disc 302 axially fixed on shaft 256 between shoulders 304 and 306 thereon, comprises a solenoid controlled motor braking device 308. The motor brake 308 is maintained in position as shown by an annular shoulder 310 on core 290 which is held in an annular groove of a brake housing insert member 312. The sub-assembly of the motor 60, brake 308, and gear train 258 is adjusted to desired position within the housing of by-pass control 48 by bringing into abutting relation a motor housing flange and control housing shoulder 314 and 316 respectively, and by tightening a tapered alignment screw 318 into an opening of an alignment element 320.

The solenoid of the motor brake 308 is normally energized by maintaining a pilot control switch, not shown, in closed position, in which instance the armature 296 is held in the position shown by the solenoid force thereby maintaining friction disc 302 and the brake shoe 294 out of contact, as shown. Whenever the pilot desires to fix the position of valve 170 irrespective of changes in turbine inlet temperature, as for example during an aircraft landing operation, the solenoid is de-energized and spring 300 actuates brake shoe 294 into braking relation with rotating disc 302 thereby eliminating the possibility of rotation of shaft 256 and consequent actuation of valve 170. If, during power operation of the engine control system shown in Figure 1, a very substantial turbine inlet temperature error exists for some reason, motor 60 might drive valve 170 against its maximum put or take stop depending on the direction of the temperature error, in which instance the torsion bar 266 would be driven in a twisting direction through its geared connection to motor shaft 256 as necessary to absorb the motional inertia of the motor at the moment valve 170 contacted either of said stops, thereby avoiding possible damage to the motor 60 under the assumed condition of operation.

Figure 3:
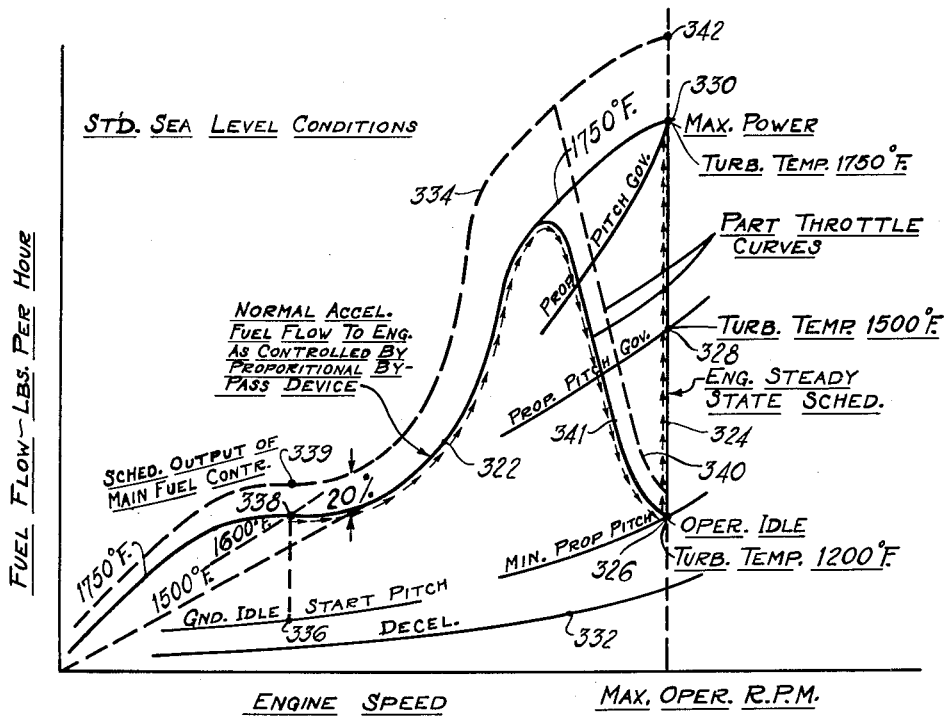
Figure 3 is a curve chart illustrating the operation of the fuel system shown in Figure 1.

Referring now to Figure 3, engine operating characteristics at standard sea level conditions are illustrated by an acceleration curve 322, an engine power regime schedule 324 having illustrated points of steady state engine operation at 326, 328 and 330, which points are determined by the intersection of propeller pitch governor lines and fuel control part throttle lines, as illustrated, and an engine deceleration curve 332, all plotted on the coordinates of fuel flow in pounds per hour versus engine speed. Broken curve 334 illustrates the scheduled output of the main fuel control during acceleration at stated conditions, which scheduled output is always, for example, 20 percent above acceleration curve 322 when the valve 170 of by-pass control 48 is in its null position; i.e. when no temperature error exists as between actual turbine inlet temperature and reference temperature and control 48 is withdrawing 20 percent of the output of main control 46. A condition of ground idle operation is illustrated at point 336 on the minimum propeller pitch curve. Exemplary turbine inlet temperature values are indicated on acceleration curve 322 and for each of the steady state points of operation 326, 328 and 330. Obviously, all of the specifically noted values which appear on Figure 3 are merely illustrative and may be varied as desired to meet different engine requirements by proper calibration of our control system.

*Operation*

Assume that the turbo-prop engine shown in Figure 1 has been started and accelerated to operate at the ground idle point 336 on the start propeller pitch curve. In this condition of operation the various elements in the complete control system would be substantially as shown in Figure 1; i.e. the propeller 24 is in a minimum pitch position at ground idle speed, the main fuel control 46 has been set by the position of pilot's lever 74 through control linkage 76 to govern the engine at ground idle speed, and the relay 100 is energized thereby holding double throw switch 106 in the position shown to establish the fixed temperature reference in electronic unit 58 at 1750° F. and to energize solenoid 124, whereby the by-pass control 48, in combination with unit 58 and motor 60, operates as an overtemperature limiter. Inasmuch as the main fuel control 46 controls engine speed and fuel flow at ground idle operation the temperature error sensed by electronic unit 58, which results from the difference between the relatively low actual turbine inlet temperature existent at ground idle point 336 and the fixed temperature of 1750° F. to which unit 58 is referenced, causes motor 60 to attempt to drive valve 170 of control 48 in a put direction; such action, however, will be effectively overridden by maximum put-stop 250 which abuts valve 170 at its null position, thereby fixing a minimum fuel by-pass of 20 percent, as shown. The engine will therefore operate at ground idle speed and fuel flow until such time as the pilot advances control lever 74. If the pilot wishes to accelerate the engine to maximum operating r.p.m. he will advance lever 74 to the 55° position which demands engine operation at the operational idle point 326 on engine power curve 324 at a turbine inlet temperature of 1200° F. Such an advance of the pilot's lever 74 results in the substantially simultaneous occurrence of the following events: lever 76 is actuated to reset the governor of main fuel control 46 to govern engine speed only if an overspeed condition is attained, to instantly increase fuel flow to a point 339 on broken curve 334, to schedule a main control output during acceleration of the engine as illustrated by curve 334, and to schedule a part throttle curve as illustrated by broken line 340; pointer 118 is actuated to the 1200° F. point on potentiometer 110 but is ineffective to control the temperature reference until engine speed switch 104 opens at maximum operating r.p.m. to deenergize relay 100 and allow switch 106 to be actuated against terminals 120 and 130; and lever 74 is actuated out of contact with bus bars 88 and 90 thereby breaking the circuit between supply line 94 and line 96 to relay 100. Inasmuch as the main fuel control output increases to point 339 and the by-pass control valve 170 is in its null position by-passing a constant 20 percent of main control output, fuel flow to the engine nozzles through conduit 44 increases to point 338, from which point the engine accelerates along characteristic curve 322 which is, at any given engine speed, 20 percent below curve 334, and thence down part throttle curve 341 which is also a constant 20 percent below curve 340, to operational idle point 326. Throughout such an acceleration, valve 170 will be maintained in its null position by stop 250 unless an overtemperature condition at the turbine inlet should exist for any reason, in which instance electronic unit 58 would respond to an overtemperature error and drive motor 60 in a direction to actuate valve 170 away from stop 250 and toward the maximum take-stop 238 resulting in an increased percentage of fuel withdrawn and consequent reduction of turbine inlet temperature to a safe value.

At operational idle speed the propeller governor 26 becomes effective to control maximum operating speed and speed switch 104 opens deenergizing relay 100 which results in a deenergization of solenoid 124 and a resultant movement thereof to stop 253, and a temperature reference shift from 1750° F. to 1200° F. as potentiometer 110 becomes effective to control the temperature reference in unit 58 through lead 116, terminal 120, switch 106 and lead 78. If no temperature error exits under this condition of steady state operation, main control 46 is metering fuel to a point defined by the intersection of curves 340 and 324 and valve 170 of by-pass control 48 remains in its null position to by-pass 20 percent of main control output resulting in the maintenance of a desired turbine inlet temperature of 1200° F. at point 326. If, for any reason, a temperature error should exist while the engine operates at said point, valve 170 is actuated by motor 60 in a put or take direction as necessary to correct either an under or over temperature error, thereby maintaining the desired turbine temperature of 1200° F.

If the pilot should now actuate lever 74 to maximum power position at 90° of throttle angle the following events occur substantially simultaneously: main fuel control 46 is set through lever 76 to increase fuel flow to a point 342 on curve 334; propeller pitch governor 26 functions to increase propeller pitch immediately following each increment of increased fuel flow along curve 324 to maintain constant maximum operating r.p.m.; and potentiometer 110 signals a refernce voltage or temperature to electronic unit 58 of 1750° F. which corresponds to the desired operating temperature at maximum power point 330, thereby instantaneously resulting in a very large under temperature error as indicated by the difference between the reference temperature at point 330 and the momentarily existent turbine temperature at point 326, which causes actuation of valve 170 toward its maximum put-stop 250. As engine power increases along arrowed line 324 and approaches point 330 actual turbine temperature at thermocouple 66 approaches the reference temperature of 1750° F. and valve 170 is actuated toward the maximum take-stop 238 until it reaches its illustrated null position with the main control functioning to meter fuel to point 342.

If, during steady state operation at the maximum power point 330, the main control 46, for example, should, for any reason, function to increase flow above that illustrated at point 342 the electronic unit 58 would sense an over temperature error and actuate motor 60 in a direction to drive valve 170 toward the maximum take-stop 238 as far as necessary to return engine fuel flow to point 330, at which point the temperature error is zero. The new off-null position of valve 170 would be maintained unless and until a new condition occurred which caused a temperature error in either direction. The opposite mode of operation would occur should main control 46 meter, at maximum power, a fuel flow less than that indicated at point 342. In the latter instance electronic unit 58 senses an undertemperature error which results in an actuation of valve 170 by motor 60 from its normal null 20 percent by-pass position, or from any other position which it may have assumed to correct a prior temperature error, toward maximum put-stop 250 as far as necessary to return the temperature error to zero. In a similar manner, turbine inlet temperature is controlled to a desired value at any other selected point of engine power operation, such as at point 328, along the power regime curve 324.

From the above it is apparent that a temperature error which might normally exist at any given point of operation on power curve 324 as a result of possible malfunctioning of the main control 46, variations from one engine or one fuel control to another due to manufacturing tolerances or period of use, and/or variations in combustion efficiency or fuel type used, as hereinbefore discussed, would be automatically corrected as a result of the compensating action of the herein disclosed proportional by-pass control and the temperature datum system connected thereto.

My invention may be adaptable for use with any fuel system for engines wherein it is deemed desirable to correct all deviations from an optimum engine fuel flow schedule by first, metering a quantity of fuel to the engine which is greater than that quantity desired for best engine performance and secondly, withdrawing from said metered fuel that quantity necessary to optimize engine performance.

Although only one form of the control system and proportional by-pass control unit, embodying the invention, has been schematically illustrated and described, it will be understood that many changes in the system controls may be made by those skilled in the art.

I claim:

1. In a fuel feed and power control system for a gas turbine engine, a fuel conduit for delivering fuel under pressure to the engine, means associated with said conduit including valve means for withdrawing a substantially constant percentage of the fuel from said conduit at any given position of said valve means irrespective of the quantity of fuel flowing through said conduit, and means operatively connected to said valve means for controlling the position thereof including turbine temperature responsive means, a pilot's power control lever, turbine temperature reference means operatively connected to said control lever, and electrical means operatively connected to said valve means, to said turbine temperature reference means and to said turbine temperature responsive means for controlling the position of said valve means in such a manner that actual turbine temperature is maintained substantially equal to the scheduled turbine temperature reference during operation of the engine.

2. In a fuel feed and power control system for a gas turbine engine, a fuel pump, a fuel conduit for delivering fuel under pressure from said fuel pump to the engine, fuel control means in said conduit downstream from said fuel pump and in series flow relationship therewith for scheduling a predetermined flow of fuel therethrough under all conditions of engine operation, control means associated with said conduit for continuously withdrawing a certain percentage of the scheduled output of said fuel control means irrespective of the quantity of fuel flowing through said conduit, and means operatively connected to said control means for establishing the percentage of the scheduled output of said fuel control means which will be withdrawn by said control means as a continuous function of an engine operating condition under all conditions of engine operation, said engine operating condition being indicative of engine power output.

3. In a fuel feed and power control system for a gas turbine engine, a fuel conduit for delivering fuel under pressure to the engine, main fuel control means in said conduit for scheduling a predetermined flow of fuel therethrough during steady state and acceleration operation of the engine, means associated with said conduit including normally open valve means for withdrawing a substantially constant percentage of the scheduled output of said main control means at any given position of said valve means, and means operatively connected to said valve means for controlling the normally open position thereof as a continuous function of a predetermined reference schedule of an engine temperature throughout the entire temperature range.

4. In a fuel feed and power control system for a gas turbine engine having a burner, a compressor and a turbine for driving the compressor, a fuel conduit for delivering fuel under pressure to the burner, main fuel control means in said conduit for scheduling the flow of fuel through said conduit under all conditions of engine operation, means in flow controlling relation with said main control means including a valve for modifying said scheduled output of flow to the burner over the operating range of the engine by withdrawing from said conduit a substantially constant percentage of said scheduled output for each different position of said valve, and means for controlling the position of said valve as a continuous function of a preselected schedule of an engine temperature throughout the entire temperature range in such a manner that said valve will by-pass that percentage of the scheduled output of said main fuel control which is necessary to maintain said preselected schedule of engine temperature.

5. In a fuel feed and power control system for a gas turbine engine having a compressor and a burner for delivering motive fluid under pressure to a gas turbine which is drivably connected to the compressor, a fuel conduit for delivering fuel under pressure to the burner, a main fuel control device for scheduling a predetermined flow of fuel through said conduit at any given condition of engine operation, a put-and-take fuel control means in said conduit including valve means for withdrawing a substantially constant percentage of the scheduled output of said main control device at any given position of said valve means irrespective of variations in said scheduled output, a pilot's control device selectively actuatable to obtain any desired condition of engine power operation within the operating limits of the engine, and an operative connection between said pilot's control device and said valve means including turbine temperature reference means for demanding a predetermined turbine temperature at any given position of said pilot's control lever, means responsive to changes in actual turbine temperature, an electronic temperature control and amplifier means for producing a signal whenever actual turbine temperature is unequal to the reference turbine temperature, said signal varying as a function of the direction and degree of difference between actual and reference turbine temperatures, and reversible motor means responsive to said signal for driving said valve means in a put direction whenever turbine temperature is less than reference temperature and in a take direction whenever turbine temperature is greater than the reference temperature.

6. In combination, a fluid conduit, pumping means for pressurizing fluid in said conduit, fluid control means in said conduit adapted to receive the output of said pumping means and to meter fluid to a predetermined schedule of flow on the downstream side of the control means, and a control device in series with said fluid control means and adapted to by-pass a predetermined percentage of the fluid flowing therethrough to the inlet side of said pumping means including a by-pass valve means, means for controlling the position of said valve means, and means for controlling the fluid head across said valve means as a function of the quantity of fluid flowing through said conduit, whereby a substantially constant percentage of the fluid flowing through said conduit will be by-passed through said valve means at any given position thereof irrespective of variations in the quantity of fluid flowing in said conduit.

7. A fluid flow control device comprising main conduit means for conducting pressurized fluid to a point of discharge, means in said conduit for creating a fluid pressure drop which is a function of the quantity of fluid flowing therethrough, passage means connected to said conduit means downstream of said pressure drop creating means, and means in said passage means operatively connected to said pressure drop creating means for continuously withdrawing a substanitally constant percentage of the fluid flowing through said conduit means irrespective of wide variations in the quantity of fluid flowing through said conduit means including means continuously responsive to a low pressure in said pressure drop creating means.

8. A fluid flow control device comprising main conduit means for conducting pressurized fluid to a point of discharge, means in said conduit for creating a fluid pressure drop which is a function of the quantity of fluid flowing therethrough, passage means connected to said conduit means downstream of said pressure drop creating means, and means in said passage means including a restriction and means operatively connected to said pressure drop creating means for controlling a fluid pressure level on the downstream side of said restriction to equal the lesser fluid pressure which exists in said pressure drop creating means.

9. A fluid flow control device comprising main conduit means for conducting pressurized fluid to a point of discharge, venturi means in said conduit, a branch conduit connected to said conduit means downstream of said venturi means, and means in said branch conduit including a restriction and valve means responsive to a low pressure source in the venturi for maintaining the fluid pressure downstream of said restriction equal to the pressure at said low pressure source.

10. A fluid flow control device comprising a main conduit means for conducting pressurized fluid to a point of discharge, a venturi in said conduit means, and means for measuring a constant percentage of the fluid flowing through said venturi irrespective of variations in the quantity thereof including a restriction and means for maintaining a fluid pressure drop across said restriction which is at all times equal to the pressure recovery or rise through said venturi.

11. A fluid flow device comprising a main conduit means for conducting pressurized fluid to a point of discharge, venturi means in said conduit, a branch conduit connected to said conduit means downstream of said venturi means, a first valve means in said branch conduit, a second valve means in said branch conduit downstream of said first valve means for controlling the fluid pressure level downstream of said first valve means, a fluid pressure chamber, movable wall means in said chamber connected to said second valve means, a passage connecting said chamber to a low pressure source in said venturi means, and means for controlling the position of said first valve means.

12. In combination, a conduit for flowing hydraulic fluid under pressure, a venturi in said conduit, a passage connected to said conduit downstream of said venturi for diverting a proportional amount of the fluid flowing through said conduit, first valve means in said passage, means for controlling said valve means as a function of a condition, second valve means in said passage for controlling the fluid pressure level downstream of said first valve means, and means for controlling said second valve means as a function of a low fluid pressure sensed to said venturi, whereby the flow of fluid through said first valve means at any given position thereof is a substantially constant percentage of the flow of fluid through said venturi.

13. In combination, a conduit for flowing hydraulic fluid, means in said conduit for creating a fluid pressure drop which is a function of the quantity of fluid flowing therethrough, a passageway connected to said conduit downstream of said means for diverting fluid from said conduit, first and second valvular means in series flow relation in said passage for controlling the quantity of fluid diverted from said conduit, means for controlling the position of said first valvular means as a function of a temperature condition, and means for controlling the position of said second valvular means as a function of a pressure condition in said first mentioned means whereby the quantity of fluid diverted from said conduit is a substantially fixed percentage of the total flow through said conduit at any given position of said first valvular means.

References Cited in the file of this patent

UNITED STATES PATENTS

| | | |
|---|---|---|
| 2,405,888 | Holley | Aug. 13, 1946 |
| 2,610,466 | Ballantyne et al. | Sept. 16, 1952 |
| 2,632,996 | Rood | Mar. 31, 1953 |
| 2,657,530 | Lee | Nov. 3, 1953 |
| 2,667,935 | Woodward | Feb. 2, 1954 |
| 2,700,275 | Chandler | Jan. 25, 1955 |
| 2,828,606 | Coar | Apr. 1, 1958 |

UNITED STATES PATENT OFFICE
CERTIFICATE OF CORRECTION

Patent No. 2,979,894                                   April 18, 1961

Harry C. Zeisloft

It is hereby certified that error appears in the above numbered patent requiring correction and that the said Letters Patent should read as corrected below.

Column 3, line 73, for "genreal" read -- general --; column 9, line 53, for "refernce" read -- reference --; column 12, line 75, for "to" read -- in --.

Signed and sealed this 10th day of October 1961.

(SEAL)
Attest:

ERNEST W. SWIDER
Attesting Officer

DAVID L. LADD
Commissioner of Patents

USCOMM-DC